W. K. CHASE.
GAS PIPE AND BURNERS FOR PREVENTING FROST ON SHOW-WINDOWS.
No. 195,090. Patented Sept. 11, 1877.
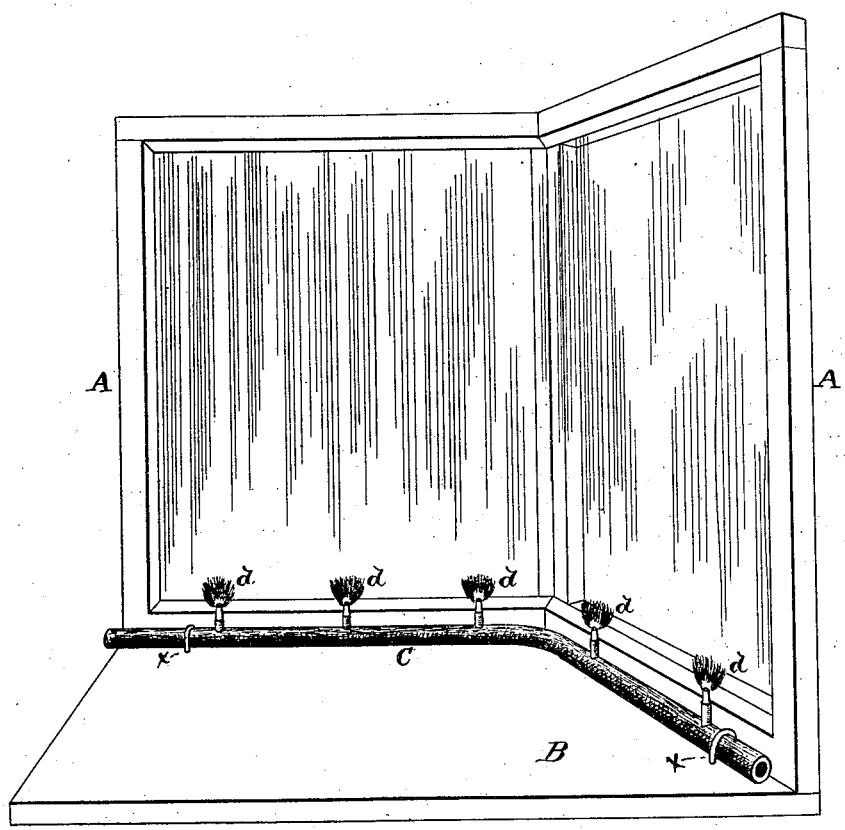
WITNESSES
Henry N. Miller
Franck L. Ourand
INVENTOR
Wm. K. Chase,
Alexander & Mason
ATTORNEYS.

UNITED STATES PATENT OFFICE.

WILLIAM K. CHASE, OF LOWELL, MASSACHUSETTS, ASSIGNOR OF ONE-HALF HIS RIGHT TO CHARLES H. WESTON, OF SAME PLACE.

IMPROVEMENT IN GAS PIPES AND BURNERS FOR PREVENTING FROST ON SHOW-WINDOWS.

Specification forming part of Letters Patent No. 195,090, dated September 11, 1877; application filed February 1, 1877.

*To all whom it may concern:*

Be it known that I, WILLIAM K. CHASE, of Lowell, in the county of Middlesex, and in the State of Massachusetts, have invented certain new and useful Improvements in Device for Removing Frost from Show-Windows; and do hereby declare that the following is a full, clear, and exact description thereof, reference being had to the accompanying drawings, and to the letters of reference marked thereon, making a part of this specification.

The nature of my invention consists in the arrangement of gas-pipes within show-windows, near their bottoms, and in such close proximity to the glass that the heat from the burners will not injure the glass, but protect and remove the frost from same, as will be hereinafter set forth.

To enable others skilled in the art to make and use my invention, I will now proceed to describe its construction and mode of operation.

In the accompanying drawing, which is a perspective, and which makes a part of this specification, A A represent two sides of an ordinary glass show-window, and B represents the bottom of the same. Upon this bottom, and contiguous to the glass sides of the window, is placed a gas-pipe, $c$, which pipe is provided with a series of gas-burners, $d\ d$, and which is secured directly to the bottom by staples $x\ x$ or equivalent devices.

These burners may be placed as close together as required to accomplish the object, care being taken that they do not throw their flames so close to the glass as to in any manner damage it.

The heat rising from the flames is intended to impart sufficient heat to the glass sides of the window to effectually prevent it from being coated with frost.

Having thus fully described my invention, what I claim as new, and desire to secure by Letters Patent, is—

The gas-pipe $c$, provided with a series of burners, $d\ d$, and secured upon the bottom of a show-window, and in close proximity to the glass of the same, by means of staples $x\ x$ or equivalent devices, as and for the purpose herein set forth.

In testimony that I claim the foregoing I have hereunto set my hand this 16th day of January, 1877.

W. K. CHASE.

Witnesses:
 J. LADD,
 J. R. SPRING.